(12) United States Patent
Derks et al.

(10) Patent No.: US 12,736,732 B2
(45) Date of Patent: Sep. 15, 2026

(54) OPTICAL FILM, REFLECTIVE POLARIZER, OPTICAL STACK, AND OPTICAL CONSTRUCTION

(71) Applicant: 3M INNOVATIVE PROPERTIES COMPANY, St. Paul, MN (US)

(72) Inventors: Kristopher J. Derks, Woodbury, MN (US); David J. McDaniel, Lino Lakes, MN (US); Kevin T. Huseby, Oakdale, MN (US); Stephen A. Johnson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 786 days.

(21) Appl. No.: 17/993,142

(22) Filed: Nov. 23, 2022

(65) Prior Publication Data

US 2023/0168421 A1 Jun. 1, 2023

Related U.S. Application Data

(60) Provisional application No. 63/264,613, filed on Nov. 29, 2021.

(51) Int. Cl.
*G02B 5/30* (2006.01)
*G02B 5/04* (2006.01)

(52) U.S. Cl.
CPC .............. *G02B 5/305* (2013.01); *G02B 5/045* (2013.01)

(58) Field of Classification Search
CPC ....... G02B 5/305; G02B 5/045; G02B 5/3083
USPC ..................................................... 359/485.03
See application file for complete search history.

(56) References Cited

U.S. PATENT DOCUMENTS 5,828,488 A * 10/1998 Ouderkirk ............ G02B 5/3083 359/485.02
2005/0207002 A1* 9/2005 Liu ........................ G02B 5/282 359/359
2008/0075936 A1* 3/2008 McGurran ................ C08J 5/18 428/212

(Continued)

FOREIGN PATENT DOCUMENTS

EP 3753969 A1 * 12/2020 ............. C08G 69/26
JP 2015038631 A * 2/2015
KR 20070084310 A * 8/2007 ............. B32B 27/36

*Primary Examiner* — William R Alexander
*Assistant Examiner* — Alaina Marie Swanson
(74) *Attorney, Agent, or Firm* — Clifton F. Richardson; Theresa Stadheim

(57) ABSTRACT

An optical film includes a plurality of polymeric microlayers disposed between, and co-extruded and co-stretched with, opposing first and second polymeric skins. Each of the polymeric microlayers has an average thickness of less than about 400 nm. Each of the first and second polymeric skins has an average thickness of greater than about 1 micron. At least one of the first and second polymeric skins includes a plurality of polymeric skin layers. Each of the polymeric skin layers has an average thickness of greater than about 0.5 microns. The plurality of polymeric skin layers includes a polymeric second skin layer disposed between polymeric first and third skin layers. The polymeric second skin layer includes one or more of a greater degree of crystallinity, a greater glass transition temperature, a greater modulus, and a greater in-plane birefringence than each of the polymeric first and third skin layers.

13 Claims, 6 Drawing Sheets

(56) References Cited

U.S. PATENT DOCUMENTS

2011/0171440 A1* 7/2011 Cheng .................... B32B 7/023
156/163

* cited by examiner

OPTICAL FILM, REFLECTIVE POLARIZER, OPTICAL STACK, AND OPTICAL CONSTRUCTION

TECHNICAL FIELD

The present disclosure relates to an optical film, a reflective polarizer, and an optical construction including a prism film.

BACKGROUND

A conventional optical construction may include a multilayer optical film (MOF) laminated to a brightness enhancement film in order to provide brightness enhancement optical properties. The brightness enhancement film typically includes a plurality of prisms including respective prism tips. The MOF may be laminated to the brightness enhancement film, such that the prism tips of the brightness enhancement film are adhered to a surface of the MOF. During use of the MOF, the prism tips may penetrate one or more layers of the MOF, which may negatively affect optical properties of the MOF and/or the optical construction.

SUMMARY

In a first aspect, the present disclosure provides an optical film including a plurality of polymeric microlayers numbering at least 10 in total. The plurality of polymeric microlayers is disposed between, and co-extruded and co-stretched with, opposing first and second polymeric skins. Each of the polymeric microlayers has an average thickness of less than about 400 nanometers (nm). Each of the first and second polymeric skins has an average thickness of greater than about 1 micron. At least one of the first and second polymeric skins includes a plurality of polymeric skin layers. Each of the polymeric skin layers has an average thickness of greater than about 0.5 microns. The plurality of polymeric skin layers includes a polymeric second skin layer disposed between polymeric first and third skin layers. The polymeric second skin layer includes one or more of a greater degree of crystallinity, a greater glass transition temperature, a greater modulus, and a greater in-plane birefringence than each of the polymeric first and third skin layers.

In a second aspect, the present disclosure provides a reflective polarizer including a plurality of polymeric microlayers numbering at least 10 in total. The plurality of polymeric microlayers is disposed on, and co-extruded and co-stretched with, an outermost first polymeric skin. Each of the polymeric microlayers has an average thickness of less than about 400 nm. The first polymeric skin includes a stop layer having an average thickness of greater than about 0.75 microns. When an optical stack is formed by placing the reflective polarizer on a prism film, the prism film including a plurality of substantially linear prisms including a plurality of substantially linear prism tips, the stop layer faces the linear prism tips. When a substantially constant compressive force is applied to a stop layer side of the optical stack substantially uniformly over a contact area resulting in a pressure of greater than 0.05 millinewtons per millimeter (mN/mm) applied to a total length of the linear prism tips that make physical contact with the stop layer in the contact area while subjecting the optical stack to a temperature of at least about 60 degrees Celsius (° C.) for at least about 50 hours, any penetration of the linear prism tips into the stop layer across the contact area is less than about 5% of an average height of the plurality of linear prisms that make physical contact with the stop layer in the contact area.

In a third aspect, the present disclosure provides a reflective polarizer including a plurality of polymeric microlayers numbering at least 10 in total. The plurality of polymeric microlayers is disposed on, and co-extruded and co-stretched with, an outermost first polymeric skin. Each of the polymeric microlayers has an average thickness of less than about 400 nm. The first polymeric skin includes one or more substantially amorphous stop layers. Each of the one or more stop layers has an average thickness of greater than about 0.75 microns. When an optical stack is formed by placing the reflective polarizer on a prism film, the prism film including a plurality of linear prisms including a plurality of linear prism tips, a first one of the one more stop layers faces the linear prism tips. When a substantially constant compressive force is applied to a stop layer side of the optical stack substantially uniformly over a contact area resulting in a pressure of greater than 0.05 mN/mm applied to a total length of the linear prism tips that make physical contact with the first one of the one more stop layers in the contact area while subjecting the optical stack to a temperature that is greater than a glass transition temperature of the first one of the one more stop layers by at least about 1.5% for at least about 5 hours and at most about 15 hours, any penetration of the linear prism tips into the first one of the one more stop layers across the contact area is less than about 15% of an average height of the plurality of linear prisms that make physical contact with the first one of the one or more stop layers in the contact area.

In a fourth aspect, the present disclosure provides an optical construction including a prism film including a plurality of linear prisms including a plurality of linear prism tips. The optical construction further includes an optical film disposed on the prism film. The optical film includes a plurality of polymeric microlayers numbering at least 10 in total. The plurality of polymeric microlayers is and disposed on, and co-extruded and co-stretched with, an outermost polymeric skin. Each of the polymeric microlayers has an average thickness of less than about 400 nm. The outermost polymeric skin includes a substantially crystalline stop layer. The optical construction further includes a substantially amorphous outermost layer disposed adjacent to the stop layer and facing the linear prism tips. Each of the stop layer and the outermost layer has an average thickness of greater than about 100 nm. The optical construction further includes an optical adhesive layer disposed between the outermost layer and the prism film. Portions of the linear prism tips penetrate the optical adhesive layer and the outermost layer, and not greater than about 4 microns in the stop layer, to define an interior air cavity between the prism and optical films.

In a fifth aspect, the present disclosure provides an optical construction. The optical construction includes an optical film including a plurality of polymeric microlayers numbering at least 10 in total. The plurality of polymeric microlayers is disposed on, and co-extruded and co-stretched with, an outermost polymeric skin. Each of the polymeric microlayers has an average thickness of less than about 400 nm. The outermost polymeric skin includes a substantially amorphous outermost skin layer having an average thickness of greater than about 0.75 microns. The optical construction further includes a prism film disposed on the optical film. The prism film includes a plurality of flat-top substantially linear first prisms including a plurality of substantially flat first tops facing the substantially amorphous outermost skin layer of the optical film. The flat first tops have an average width W, W≥0.5 microns. The optical construction further includes an optical adhesive layer disposed between the substantially amorphous outermost skin layer and the prism film. Portions of the flat first tops penetrating the optical adhesive layer define an interior air cavity between the prism and optical films. When a substantially constant compressive force is applied to the optical construction substantially uniformly over a contact area resulting in a pressure of greater than 0.05 mN/mm applied to a total length of the flat first tops that make physical contact with the substantially amorphous outermost skin layer in the contact area while subjecting the optical construction to a temperature that is greater than a glass transition temperature of the substantially amorphous outermost skin layer by at least about 1.5% for at least about 8 hours, any penetration of the flat first tops into the substantially amorphous outermost skin layer across the contact area is less than about 7% of an average height of the plurality of flat-top substantially linear first prisms.

BRIEF DESCRIPTION OF DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
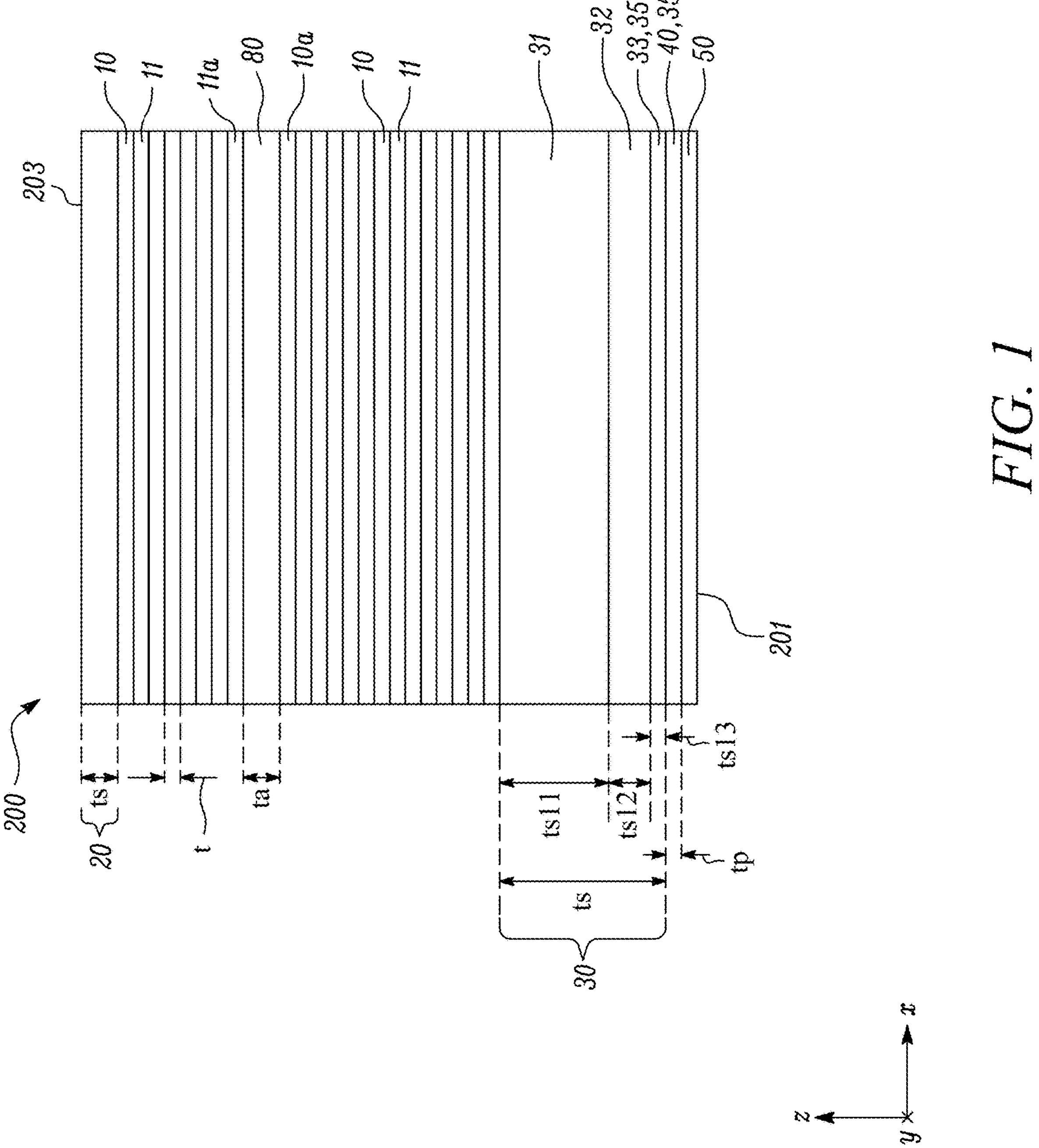
FIG. 1 illustrates a detailed schematic sectional view of an optical film, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

As used herein, all numbers should be considered modified by the term "about". The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, when a first material is termed as "similar" to a second material, at least 90 weight % of the first and second materials are identical and any variation between the first and second materials comprises less than about 10 weight % of each of the first and second materials.

As used herein, "at least one of A and B" should be understood to mean "only A, only B, or both A and B".

As used herein, the term "film" generally refers to a material with a very high ratio of length or width to thickness. A film has two major surfaces defined by a length and width. Films typically have good flexibility and can be used for a wide variety of applications, including displays. Films may also be of thickness or material composition, such that they are semi-rigid or rigid. Films described in the present disclosure may be composed of various polymeric materials. Films may be monolayer, multilayer, or blend of different polymers.

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

As used herein, the term "between about", unless otherwise specifically defined, generally refers to an inclusive or a closed range. For example, if a parameter X is between about A and B, then A≤X≤B.

As used herein, the term "index", unless otherwise specifically defined, generally refers to a refractive index of a material or a layer. Similarly, the term "indices", unless otherwise specifically defined, generally refers to refractive indices of multiple materials or layers.

As used herein, the term "co-extruded" refers to two or more polymer materials extruded through a single die with two or more orifices arranged so that extrudates of the two or more polymer materials merge and weld together into a laminar structure before chilling, i.e., quenching. The film according to the present disclosure may be fabricated by any coextrusion method known to a person of ordinary skill in the art which may include, but is not limited to, blown film coextrusion, slot cast coextrusion, and extrusion coating.

As used herein, the term "glass transition temperature" or "Tg" refers to a temperature below which the physical properties of plastics change in a manner similar to those of a glassy or crystalline state, and above which they behave like rubbery materials. In other words, the glass transition temperature of a polymer is the temperature below which molecules have little relative mobility. The glass transition temperature may be measured using a differential scanning calorimetry method and expressed in degree Celsius (° C.).

A conventional multilayer optical film (MOF), for example, a reflective polarizer includes a plurality of layers of birefringent materials that are oriented at elevated temperatures to achieve a selective substantial transmittivity for a light incident on the MOF having a specific polarization state. The MOF may further be provided with protective layers, such as skin layers. However, low-cost skin layers typically include materials with low glass transition temperatures. Further, the materials with low glass transition temperatures do not crystallize at the elevated temperatures and retain an amorphous phase, which may provide multiple advantages during manufacture of the MOF. For example, MOF reflective polarizers are oriented in a transverse direction, making them prone to film splitting in the transverse direction when a tension is applied along a machine direction. The skin layers including the materials with low glass transition temperatures may limit a likelihood of film splitting as the materials retain their amorphous phase.

The conventional MOF may be provided with multifunctional properties, such as brightness enhancement by laminating the MOF with a brightness enhancement element, such as a brightness enhancement film. Conventional brightness enhancement films include a plurality of prisms having respective prism tips. Typically, the brightness enhancement film is laminated to an MOF, such that prism tips of the brightness enhancement film are adhered to a surface of the MOF over a small area. This may provide an air interface between the brightness enhancement film and the MOF, which may be required for the brightness enhancement film to provide effective brightness enhancement.

However, during use of the MOF, particularly, due to an elevated temperature and humidity of an environment in which the MOF is used, and due to prolonged use of the MOF, a buckling of the MOF may occur due to different coefficients of expansion of materials of the MOF and the brightness enhancement film. Further, the buckling may cause a force to be applied at an interface between the MOF and the brightness enhancement film, which may result in penetration of the prism tips of the brightness enhancement film into the skin layer at the surface of the MOF. The penetration may increase an area of optical coupling of the prism tips with the skin layer at the surface of the MOF, thereby creating localized spots. There may be decreased collimation at the localized spots. Further, there may be increased light leakage at the localized spots, particularly for obliquely incident light. Such localized spots may create optical defects.

Furthermore, if the force applied at the interface between the MOF and the brightness enhancement film is sufficiently high, the prism tips may further penetrate one or more birefringent layers of the MOF and may negatively affect optical properties of the MOF by, for example, creating optical defects, such as non-uniform contrast.

In an aspect, the present disclosure provides an optical film including a plurality of polymeric microlayers numbering at least 10 in total. The plurality of polymeric microlayers is disposed between, and co-extruded and co-stretched with, opposing first and second polymeric skins. Each of the polymeric microlayers has an average thickness of less than about 400 nanometers (nm). Each of the first and second polymeric skins has an average thickness of greater than about 1 micron. At least one of the first and second polymeric skins includes a plurality of polymeric skin layers. Each of the polymeric skin layers has an average thickness of greater than about 0.5 microns. The plurality of polymeric skin layers includes a polymeric second skin layer disposed between polymeric first and third skin layers. The polymeric second skin layer includes one or more of a greater degree of crystallinity, a greater glass transition temperature, a greater modulus, and a greater in-plane birefringence than each of the polymeric first and third skin layers.

In another aspect, the present disclosure provides a reflective polarizer including a plurality of polymeric microlayers numbering at least 10 in total. The plurality of polymeric microlayers is disposed on, and co-extruded and co-stretched with, an outermost first polymeric skin. Each of the polymeric microlayers has an average thickness of less than about 400 nm. The first polymeric skin includes a stop layer having an average thickness of greater than about 0.75 microns. When an optical stack is formed by placing the reflective polarizer on a prism film, the prism film including a plurality of substantially linear prisms including a plurality of substantially linear prism tips, the stop layer faces the linear prism tips. When a substantially constant compressive force is applied to a stop layer side of the optical stack substantially uniformly over a contact area resulting in a pressure of greater than 0.05 millinewtons per millimeter (mN/mm) applied to a total length of the linear prism tips that make physical contact with the stop layer in the contact area while subjecting the optical stack to a temperature of at least about 60 degrees Celsius (° C.) for at least about 50 hours, any penetration of the linear prism tips into the stop layer across the contact area is less than about 5% of an average height of the plurality of linear prisms that make physical contact with the stop layer in the contact area.

The optical stack of the present disclosure includes the prism film that is disposed on the optical film, such that the stop layer faces the prism tips. When a substantially uniform force is applied at the stop layer side of the optical stack, for example, when the optical stack undergoes buckling due to prolonged use at elevated temperatures and humidity, the penetration of the prism tips into the stop layer is less than about 5% of the average height of the linear prisms. In other words, the stop layer may prevent a substantial penetration of the prism tips into the plurality of polymeric microlayers. Therefore, an optical performance of the optical stack including the optical film of the present disclosure may not significantly change or deteriorate during an operating life of the optical stack.

Referring now to figures, FIG. 1 illustrates a detailed schematic sectional view of an optical film 200, according to an embodiment of the present disclosure. The optical film 200 defines mutually orthogonal x-, y-, and z-directions. The x- and y-directions correspond to in-plane axes of the optical film 200, while the z-direction is a transverse axis disposed along a thickness of the optical film 200. In other words, the x- and y-directions are disposed along a plane (i.e., x-y plane) of the optical film 200, and the z-direction is disposed perpendicular to the plane of the optical film 200. The z-direction may be interchangeably referred to as "the thickness direction". In some embodiments, the optical film 200 includes opposing outermost surfaces 201, 203.

In some embodiments, at least one of the opposing outermost surfaces 201, 203 may be exposed to an external environment. In some embodiments, the outermost surface 203 may be exposed to the external environment.

The optical film 200 includes a plurality of polymeric microlayers 10, 11. The plurality of polymeric microlayers 10, 11 may be interchangeably referred to as "the polymeric microlayers 10, 11". In some embodiments, the plurality of polymeric microlayers 10, 11 includes a plurality of alternating first and second polymeric microlayers 10, 11. The plurality of polymeric microlayers 10, 11 may also be interchangeably referred to as "the plurality of alternating first and second polymeric microlayers 10, 11". The plurality of polymeric microlayers 10, 11 numbers at least 10 in total. In some embodiments, the plurality of polymeric microlayers 10, 11 numbers at least 25, at least 50, at least 100, at least 150, at least 200, at least 250, at least 300, at least 350, or at least 400 in total.

In some embodiments, the plurality of polymeric microlayers 10, 11 may include one or more polymeric materials, for example, polyhexylethylene naphthalate (PHEN), polyethylene naphthalate (PEN), copolymers containing PHEN, PEN and/or other polyesters (e.g., polyethylene terephthalate (PET) or polyesters containing dibenzoic acid), glycol modified polyethylene terephthalate, polycarbonate (PC), poly (methyl methacrylate) (PMMA), or blends of these classes of materials.

The plurality of first polymeric microlayers 10 may be interchangeably referred to as "the first polymeric microlayers 10". In some embodiments, the plurality of first polymeric microlayers 10 may include a high index optical (HIO) layer. In some embodiments, the first polymeric microlayers 10 include a copolymer containing polyethylene naphthalate (CoPEN). However, in some other embodiments, the first polymeric microlayers 10 may include a PET homopolymer (100 mol % terephthalic acid with 100 mol % ethylene glycol) having a glass transition temperature (Tg) from about 81 degrees Celsius (° C.) to about 83° C. In some other embodiments, the plurality of first polymeric microlayers 10 may also include the HIO layer including polyethylene naphthalate (PEN). In yet other embodiments, the plurality of first polymeric microlayers 10 may include the HIO layer including low melt PEN.

The plurality of second polymeric microlayers 11 may be interchangeably referred to as "the second polymeric microlayers 11". In some embodiments, the plurality of second polymeric microlayers 11 may include a low index optical (LIO) layer. In some embodiments, the second polymeric microlayers 11 include a glycol-modified polyethylene terephthalate (PETg). However, in some embodiments, the second polymeric microlayers 11 may include the LIO layer including copolymer of poly (methyl methacrylate) or CoPMMA, available, for example, from Plaskolite, Columbus, OH, under the tradename OPTIX and having a Tg of about 80° C. In some other embodiments, the plurality of second polymeric microlayers 11 may include the LIO layer including CoPET (copolymer of polyethylene terephthalate) or CoPEN (copolymer of polyethylene naphthalate), or a blend of polycarbonate and CoPET.

Each of the polymeric microlayers 10, 11 has an average thickness t. Each of the polymeric microlayers 10, 11 defines the average thickness t along the z-direction. The term "average thickness t" as used herein refers to an average of thicknesses measured at multiple points along a plane (i.e., the x-y plane) of each of the polymeric microlayers 10, 11. Each of the polymeric microlayers 10, 11 has the average thickness t of less than about 400 nanometers (nm). In some embodiments, each of the polymeric microlayers 10, 11 has the average thickness t of less than about 350 nm, less than about 300 nm, less than about 250 nm, or less than about 200 nm.

In some embodiments, the plurality of alternating first and second polymeric microlayers 10, 11 include respective indices nx1 and nx2 along the same in-plane x-direction and respective indices ny1 and ny2 along the in-plane y-direction orthogonal to the x-direction. The plurality of alternating first and second polymeric microlayers 10, 11 further includes respective indices nz1 and nz2 along the thickness direction of the polymeric microlayers 10, 11 orthogonal to the x- and y-directions. In other words, the plurality of alternating first and second polymeric microlayers 10, 11 include the respective indices nz1 and nz2 along the z-direction.

In some embodiments, for at least one wavelength in a visible wavelength range extending from about 420 nm to about 680 nm, nx1 is in a range from about 1.7 to about 1.9. In some embodiments, the at least one wavelength is about 633 nm. In some embodiments, for the at least one wavelength in the visible wavelength range, nx1 is in a range from about 1.75 to about 1.87, or from about 1.78 to about 1.84. In some embodiments, for the at least one wavelength of about 633 nm, nx1 is about 1.82.

In some embodiments, for the at least one wavelength in the visible wavelength range, ny1 is in a range from about 1.5 to about 1.7. In some embodiments, for the at least one wavelength in the visible wavelength range, ny1 is in a range from about 1.55 to about 1.65, or from about 1.59 to about 1.63. In the embodiments, for the at least one wavelength of about 633 nm, ny1 is about 1.61.

In some embodiments, for the at least one wavelength in the visible wavelength range, nz1 is in a range from about 1.45 to about 1.6. In some embodiments, for the at least one wavelength in the visible wavelength range, nz1 is in a range from about 1.49 to about 1.54. In some embodiments, for the at least one wavelength of about 633 nm, nz1 is about 1.52.

Further, in some embodiments, for the at least one wavelength in the visible wavelength range, each of nx2, ny2, and nz2 is in a range from about 1.5 to about 1.62. In some embodiments, for the at least one wavelength in the visible wavelength range, each of nx2, ny2, and nz2 is in a range from about 1.55 to about 1.6. In some embodiments, for the at least one wavelength of about 633 nm, each of nx2, ny2, and nz2 is about 1.57.

Therefore, in some embodiments, each first polymeric microlayer 10 is a birefringent layer. Further, in some embodiments, each second polymeric microlayer 11 is an isotropic layer.

The plurality of polymeric microlayers 10, 11 are disposed between, and co-extruded and co-stretched with, opposing first and second polymeric skins 30, 20. In some embodiments, the first and second polymeric skins 30, 20 include the outermost surfaces 201, 203, respectively, of the optical film 200. The first and second polymeric skins 30, 20 may be collectively referred to as "the polymeric skins 30, 20". Each of the first and second polymeric skins 30, 20 has an average thickness ts. Each of the first and second polymeric skins 30, 20 defines the average thickness ts along the z-direction. The term "average thickness ts" as used herein refers to an average of thicknesses measured at multiple points along a plane (i.e., the x-y plane) of each of the first and second polymeric skins 30, 20. Each of the first and second polymeric skins 30, 20 has the average thickness ts of greater than about 1 micron. In some embodiments, each of the first and second polymeric skins 30, 20 has the average thickness ts of greater than about 2 microns, greater than about 3 microns, greater than about 4 microns, greater than about 5 microns, greater than about 10 microns, greater than about 15 microns, greater than about 20 microns, greater than about 25 microns, or greater than about 30 microns.

At least one of the first and second polymeric skins 30, 20 includes a plurality of polymeric skin layers. In the illustrated embodiment of FIG. 1, the first polymeric skin 30 includes the plurality of polymeric skin layers. Specifically, the plurality of skin layers includes a polymeric second skin layer 32 disposed between polymeric first and third skin layers 31, 33. In some embodiments, one of the polymeric first and third skin layers 31, 33 is an outermost layer of the optical film 200. In other words, one of the polymeric first and third skin layers 31, 33 includes the outermost surface 201 of the optical film 200. In some embodiments of FIG. 1, the third skin layer 33 is the outermost layer of the optical film 200, i.e., the third skin layer 33 includes the outermost surface 201 of the optical film 200.

The first, second, and third skin layers 31, 32, 33 may be collectively referred to as "the polymeric skin layers 31, 32, 33". Each of the polymeric skin layers 31, 32, 33 has an average thickness. Each of the polymeric skin layers 31, 32, 33 defines the average thickness along the z-direction. Specifically, the polymeric skin layers 31, 32, 33 have respective average thicknesses ts11, ts12, ts13 along the z-direction. The term "average thickness" as used herein refers to an average of thicknesses measured at multiple points along a plane (i.e., the x-y plane) of each of the polymeric skin layers 31, 32, 33. Each of the polymeric skin layers 31, 32, 33 has the average thickness ts11, ts12, ts13 of greater than about 0.5 microns. In other words, the polymeric first, polymeric second, and polymeric third skin layers 31, 32, 33 have the respective average thicknesses ts11, ts12, ts13 of greater than about 0.5 microns. In some embodiments, the polymeric skin layers 31, 32, 33 have the respective average thicknesses ts11, ts12, ts13 of greater than about 0.6 microns, greater than about 0.7 microns, greater than about 1 micron, greater than about 1.2 microns, greater than about 1.5 microns, greater than about 5 microns, greater than about 10 microns, greater than about 15 microns, greater than about 20 microns, greater than about 25 microns, or greater than about 30 microns.

In some embodiments, the polymeric first skin layer 31 is disposed between the plurality of polymeric microlayers 10, 11 and the polymeric third skin layer 33. In some embodiments, the average thickness ts11 of the polymeric first skin layer 31 is greater than the average thickness ts13 of the polymeric third skin layer 33 by at least 1 micron. In some embodiments, the average thickness ts11 of the polymeric first skin layer 31 is greater than the average thickness ts13 of the polymeric third skin layer 33 by at least 2 microns, at least 5 microns, at least 10 microns, at least 15 microns, at least 20 microns, or at least 25 microns.

In some embodiments, the polymeric first skin layer 31 is disposed between the plurality of polymeric microlayers 10, 11 and the polymeric second skin layer 32. In some embodiments, the average thickness ts11 of the polymeric first skin layer 31 is greater than the average thickness ts12 of the polymeric second skin layer 32 by at least 1 micron. In some embodiments, the average thickness ts11 of the polymeric first skin layer 31 is greater than the average thickness ts12 of the polymeric second skin layer 32 by at least 2 microns, at least 5 microns, at least 10 microns, at least 15 microns, at least 20 microns, or at least 25 microns.

In some embodiments, the polymeric second skin layer 32 is disposed between the plurality of polymeric microlayers 10, 11 and the polymeric third skin layer 33. In some embodiments, the average thickness ts12 of the polymeric second skin layer 32 is within about 5 microns of the average thickness ts13 of the polymeric third skin layer 33. In some embodiments, the average thickness ts12 of the polymeric second skin layer 32 is within about 4 microns, within about 3 microns, within about 2 microns, within about 1 micron, or within about 0.5 microns of the average thickness ts13 of the polymeric third skin layer 33.

The first polymeric skin 30 may be interchangeably referred to as "the outermost polymeric skin 30". In some embodiments, the plurality of polymeric microlayers 10, 11 is disposed on, and co-extruded and co-stretched with, the outermost polymeric skin 30.

The first polymeric skin 30 may further be interchangeably referred to as "the outermost first polymeric skin 30". Therefore, in some embodiments, the plurality of polymeric microlayers 10, 11 is disposed on, and co-extruded and co-stretched with, the outermost first polymeric skin 30.

In some embodiments, the polymeric third skin layer 33 is disposed between the polymeric second skin layer 32 and the outermost surface 201 of the optical film 200. The polymeric third skin layer 33 may be interchangeably referred to as "the outermost skin layer 33".

In some embodiments, the outermost skin layer 33 is substantially amorphous. Therefore, in such embodiments, the outermost polymeric skin 30 includes a substantially amorphous outermost skin layer 33. Further, the substantially amorphous outermost skin layer 33 has the average thickness ts13 of greater than about 0.75 microns. In some embodiments, the substantially amorphous outermost skin layer 33 has the average thickness ts13 of greater than about 1 micron, greater than about 1.2 microns, or greater than about 1.5 microns.

The polymeric second skin layer 32 includes one or more of a greater degree of crystallinity, a greater glass transition temperature, a greater modulus, and a greater bi-refringence than each of the polymeric first and third skin layers 31, 33. In some embodiments, the polymeric second skin layer 32 may include a greater elastic modulus than each of the polymeric first and second skin layers 31, 33. In other words, the polymeric second skin layer 32 may deform less than each of the polymeric first and third skin layers 31, 33 when acted upon by a force.

In some embodiments, the polymeric second skin layer 32 is crystalline, having a melting point of greater than about 260° C. In some embodiments, polymeric second skin layer 32 has the melting point of greater than about 273° C., greater than about 287° C., greater than about 293° C., or greater than about 298° C.

In some embodiments, each of the polymeric first and third skin layers 31, 33 has a glass transition temperature of less than about 100° C. In some embodiments, each of the polymeric first and third skin layers 31, 33 has the glass transition temperature of less than about 95° C., less than about 90° C., or less than about 85° C. In some embodiments, each of the polymeric first and third skin layers 31, 33 includes a glycol-modified polyethylene terephthalate (PETg). In some embodiments, at least one of the polymeric first and third skin layers 31, 33 includes the PETg. In some cases, the PETg may include a polyester of terephthalic acid and a mixture of predominantly 1,4-cyclohexanedimethanol and ethylene glycol.

In some embodiments, at a substantially zero percent relative humidity, the polymeric second skin layer 32 has a glass transition temperature of greater than about 100° C. In some embodiments, at the substantially zero percent relative humidity, the polymeric second skin layer 32 has the glass transition temperature of greater than about 105° C., or greater than about 110° C.

The plurality of polymeric microlayers 10, 11 of the optical film 200 is typically stretched and oriented at elevated temperatures. The polymeric first and third skin layers 31, 33 having the glass transition temperature of less than about 100° C. may not crystallize at the elevated temperatures, i.e., may remain amorphous, which may provide advantages during manufacture of the optical film 200. The polymeric first and third skin layers 31, 33 having the glass transition temperature of less than about 100° C. may limit a likelihood of film splitting of the optical film 200.

Further, the polymeric second skin layer 32 having the glass transition temperature of greater than about 100° C. may retain a rigidity at higher temperatures, for example at temperatures at which the optical film 200 may be exposed during use. As a result, the polymeric second skin layer 32 having the glass transition temperature of greater than about 100° C. may not significantly deform at elevated temperatures.

The polymeric second skin layer 32 of the outermost polymeric skin 30 may be interchangeably referred to as "the stop layer 32". In some embodiments, the stop layer 32 is substantially crystalline. Therefore, in such embodiments, the outermost polymeric skin 30 includes the substantially crystalline stop layer 32.

In some embodiments, the first polymeric skin 30 includes the stop layer 32 having the average thickness ts12 of greater than about 0.75 microns. In some embodiments, the stop layer 32 has the average thickness ts12 of greater than about 1 micron, greater than about 1.2 microns, greater than about 1.5 microns, greater than about 5 microns, greater than about 10 microns, greater than about 15 microns, greater than about 20 microns, greater than about 25 microns, or greater than about 30 microns.

In some embodiments, the first polymeric skin 30 includes one or more substantially amorphous stop layers 32. The one or more substantially amorphous stop layers 32 may be interchangeably referred to as "the one or more stop layers 32". In some embodiments, each of the one or more stop layers 32 has the average thickness ts12 of greater than about 0.75 microns. In some embodiments, each of the one or more stop layers 32 has the average thickness ts12 of greater than about 0.8 microns, greater than about 0.9 microns, greater than about 1 micron, greater than about 1.2 microns, greater than about 1.5 microns, greater than about 5 microns, greater than about 10 microns, greater than about 15 microns, greater than about 20 microns, greater than about 25 microns, or greater than about 30 microns.

In some embodiments, the polymeric second skin layer 32 includes at least one of a PEN, a CoPEN, a PC, a PC alloy, and a PMMA. In some embodiments, the stop layer 32 includes at least one of a PEN and a CoPEN.

In some embodiments, the CoPEN is substantially crystalline. However, in some other embodiments, the CoPEN is substantially amorphous.

In some embodiments, the PC alloy is substantially amorphous and has a glass transition temperature of greater than about 105° C. In some embodiments, the PC alloy includes one or more of a PC/Polyethylene (PE) alloy, a PC/PMMA alloy, a PC/acrylonitrile butadiene styrene copolymer (ABS) alloy, a PC/polystyrene (PS) alloy, a PC/polypropylene (PP) alloy, a PC/PET alloy, a PC/PETg alloy, a PC/polybutylene terephthalate (PBT) alloy, and a PC/nylon alloy.

In some embodiments, the PMMA has a glass transition temperature of greater than about 100° C.

In some embodiments, one or more layers may be disposed between the polymeric third skin layer 33 and the outermost surface 201 of the optical film 200. In some embodiments, any layer of the optical film 200 that is disposed between the polymeric third skin layer 33 and the outermost surface 201 is not co-extruded and co-stretched with the polymeric microlayers 10, 11 and the first and second polymeric skins 30, 20.

In some embodiments, any layer of the optical film 200 that is disposed between the polymeric third skin layer 33 and the outermost surface 201 may include an additional stop layer (not shown). In some embodiments, the additional stop layer may be an amorphous stop layer and may have a glass transition temperature greater than that of the polymeric third skin layer 33.

In some embodiments, any layer of the optical film 200 that is disposed between the polymeric third skin layer 33 and the outermost surface 201 is one or more of an optical adhesive 50 and an adhesion-promoting primer layer 40 for promoting adhesion to an optical adhesive.

In some embodiments, any layer of the optical film that is disposed between the polymeric third skin layer 33 and the outermost surface 201 includes the adhesion-promoting primer layer 40 disposed between the polymeric third skin layer 33 and the optical adhesive 50, the adhesion-promoting primer layer 40 promoting adhesion to the optical adhesive 50.

In some embodiments, the adhesion-promoting primer layer 40 has an average thickness tp. The adhesion-promoting primer layer 40 defines the average thickness tp along the z-direction. The term "average thickness tp" as used herein refers to an average of thicknesses measured at multiple points along a plane (i.e., the x-y plane) of the adhesion-promoting primer layer 40. The adhesion-promoting primer layer 40 has the average thickness tp of less than about 600 nm. In some embodiments, the adhesion-promoting primer layer 40 has the average thickness tp of less than about 500 nm, less than about 400 nm, less than about 300 nm, less than about 200 nm, or less than about 100 nm. In some embodiments, the adhesion-promoting primer layer 40 has the average thickness tp of between about 50 nm and about 500 nm.

In some embodiments, the optical film 200 further includes at least one auxiliary layer 80 disposed between two of the polymeric microlayers 10, 11 in the plurality of polymeric microlayers 10, 11. In some embodiments, the at least one auxiliary layer 80 has an average thickness ta. The at least one auxiliary layer 80 defines the average thickness ta along the z-direction. The term "average thickness ta" as used herein refers to an average of thicknesses measured at multiple points along a plane (i.e., the x-y plane) of the at least one auxiliary layer 80. The at least one auxiliary layer 80 has the average thickness ta of greater than about 400 nm. In some embodiments, the at least one auxiliary layer 80 has the average thickness ta of greater than about 350 nm, greater than about 300 nm, greater than about 250 nm, or greater than about 200 nm. In some embodiments, the at least one auxiliary layer 80 may have the average thickness ta of greater than about 400 nm, greater than about 500 nm, greater than about 600 nm, greater than about 700 nm, or greater than about 750 nm. In the illustrated embodiment of FIG. 1, the optical film 200 includes one auxiliary layer 80 disposed between the first and second polymeric microlayers 10*a*, 11*a*. In some embodiments, the auxiliary layer 80 may include a same material as the second polymeric layers 11, i.e., the auxiliary layer 80 may include a same material as the LIO layer.

In some embodiments, for non-overlapping first and second wavelength ranges, each of the first and second wavelength ranges at least 100 nm wide, and for each of first and second polarization states, the optical film 200 has an average optical reflectance of more than about 40% in one of the first and second wavelength ranges, and an average optical transmittance of more than about 40% in other one of the first and second wavelength ranges. In such embodiments, the optical film 200 may be an optical filter. In some embodiments, the first and second wavelength ranges are at least 200 nm, at least 300 nm, or at least 400 nm wide.

In some embodiments, the first polarization state may refer to a polarization of a substantially normally incident light (not shown) along the x-direction. In some embodiments, the first polarization state may refer to an obliquely incident light (not shown) having p-polarization. In some embodiments, the orthogonal second polarization state may refer to the polarization of the substantially normally incident light or to the polarization of the obliquely incident light along the y-direction. In some embodiments, the orthogonal second polarization state may refer to the substantially normally incident light or the obliquely incident light having s-polarization. In some embodiments, the incident light may be incident on the optical film 200 at at least one of the first and second outermost surfaces 201, 203.

In some embodiments, for the non-overlapping first and second wavelength ranges, each of the ranges at least 100 nm wide, and for each of the first and second polarization states, the optical film 200 has the average optical reflectance of greater than about 50%, greater than about 60%, greater than about 70%, or greater than about 80% in one of the first and second wavelength ranges, and the average optical transmittance of greater than about 50%, greater than about 60%, greater than about 70%, or greater than about 80% in the other one of the first and second wavelength ranges.

In some embodiments, one of the first and second wavelength ranges includes at least one visible wavelength and the other one of the first and second wavelength ranges includes at least one infrared wavelength.

Further, in some embodiments, for the visible wavelength range, the plurality of polymeric microlayers 10, 11 has the average optical reflectance of greater than about 40% for each of the first polarization state and the orthogonal second polarization state. In such embodiments, the optical film 200 may be a partial mirror. In some embodiments, for the visible wavelength range, the plurality of polymeric microlayers 10, 11 has the average optical reflectance of greater than about 45%, greater than about 50%, greater than about 60%, greater than about 70%, greater than about 80%, greater than about 90%, or greater than about 98% for each of the first polarization state and the orthogonal second polarization state.

In some embodiments, for the visible wavelength range, the plurality of polymeric microlayers 10, 11 has an average optical reflectance of greater than about 60% for the in-plane first polarization state and an average optical transmittance of greater than about 60% for the orthogonal in-plane second polarization state. In such embodiments, the optical film 200 is a reflective polarizer. In such embodiments, the optical film 200 may be interchangeably referred to as "the reflective polarizer 200". Therefore, for the visible wavelength range, the plurality of polymeric microlayers 10, 11 of the reflective polarizer 200 has an average optical reflectance of greater than about 60% for the first polarization state and an average optical transmittance of greater than about 60% for the second polarization state.

Figure 2A:
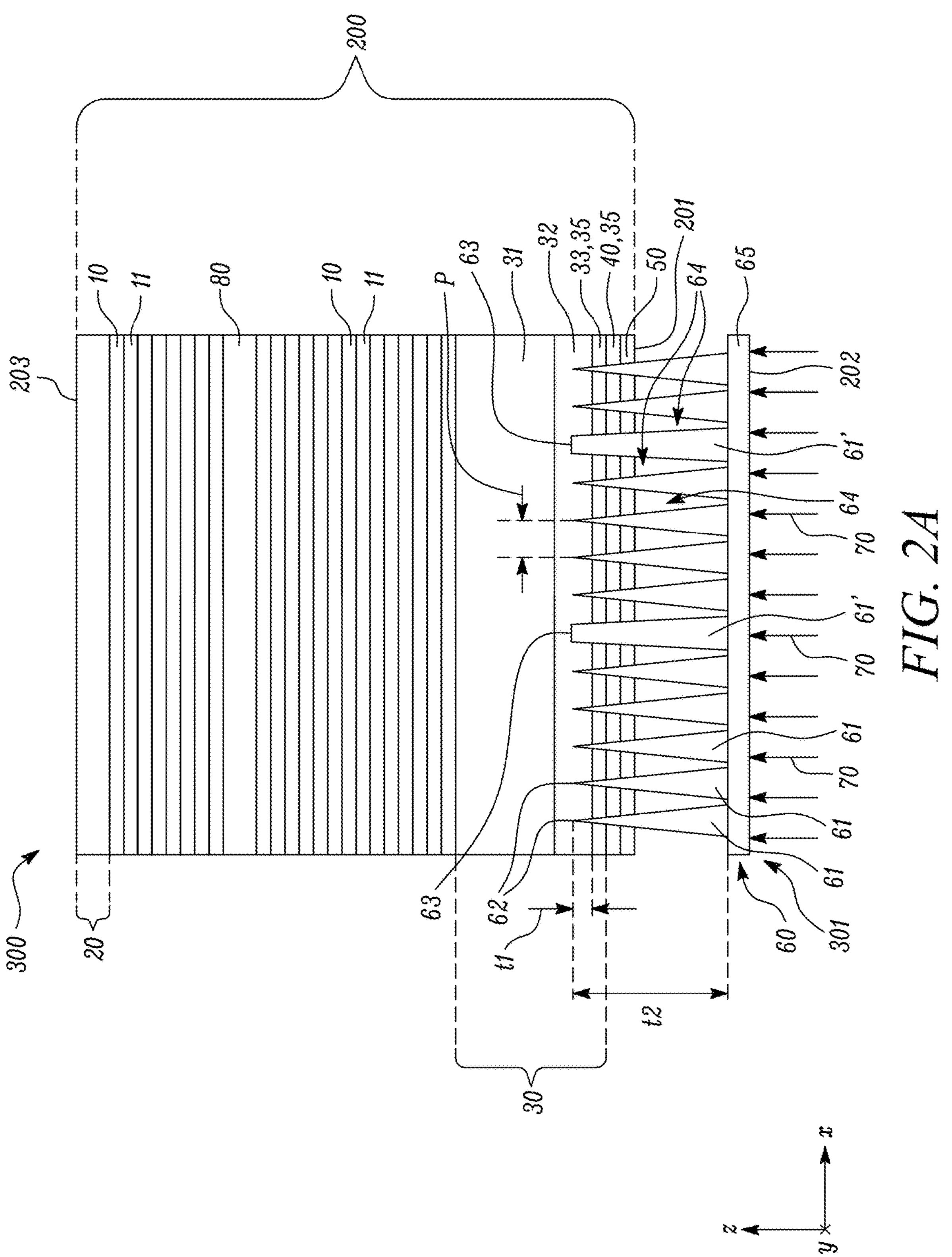
FIG. 2A illustrates a detailed schematic sectional view of an optical construction, according to an embodiment of the present disclosure.
Figure 2B:
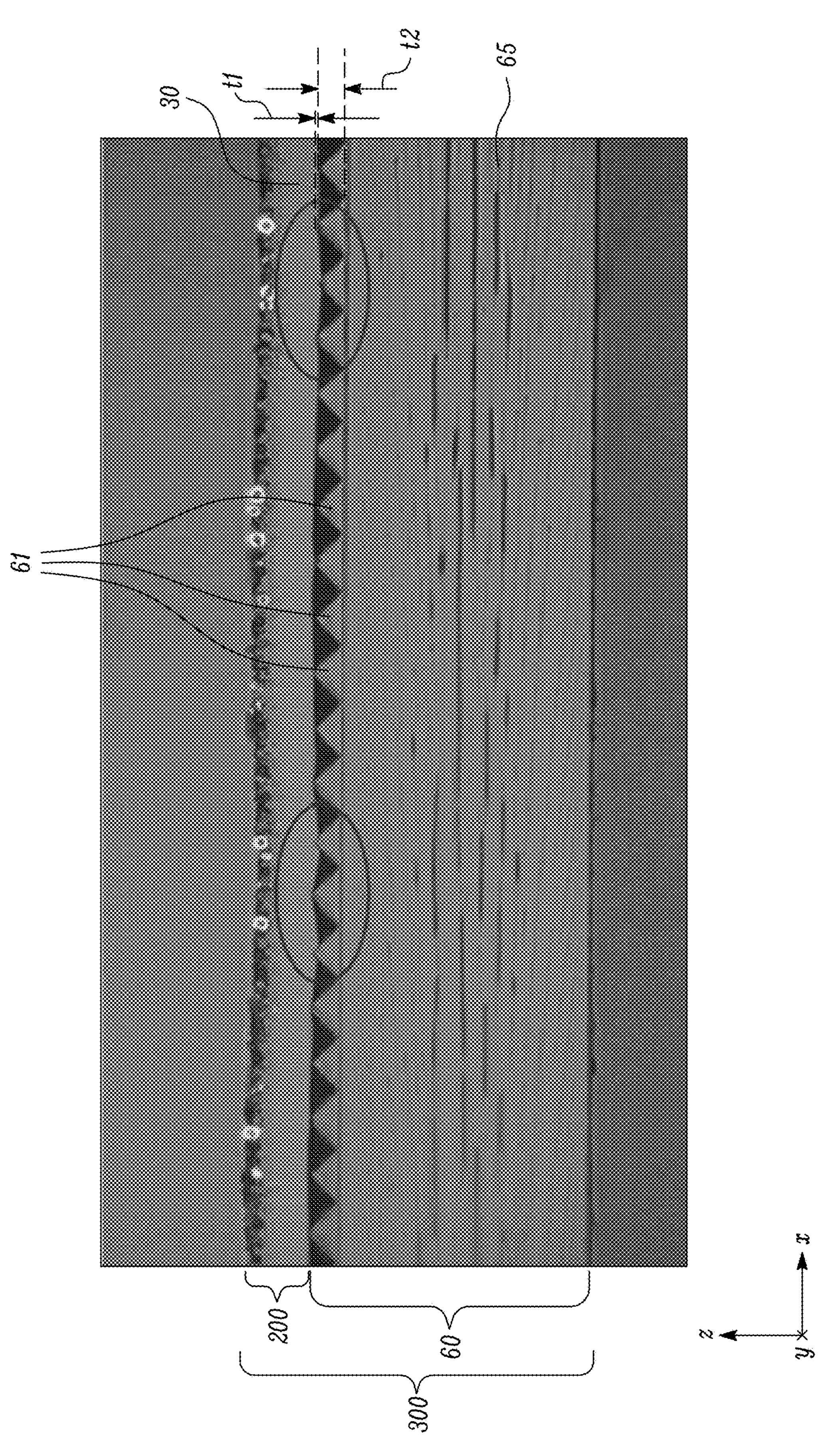
FIG. 2B illustrates an optical microphotographic image of an optical construction, according to an embodiment of the present disclosure.

FIG. 2A illustrates a detailed schematic sectional view of an optical construction 300, according to an embodiment of the present disclosure. FIG. 2B illustrates an optical microphotographic image of the optical construction 300, according to an embodiment of the present disclosure.

The optical construction 300 includes a prism film 60. In some embodiments, the prism film 60 includes a major surface 202. The optical construction 300 further includes the optical film 200 disposed on the prism film 60. In some embodiments, the outermost surface 201 of the optical film 200 may be disposed adjacent the prism film 60. Furthermore, the optical film 200 is disposed such that the major surface 202 of the prism film 60 faces away from the optical film 200. Some components of the optical film 200 are not shown, for the purpose of clarity.

The prism film 60 includes a plurality of linear prisms 61 including a plurality of linear prism tips 62. In some embodiments, the prism film 60 further includes a substrate 65. The plurality of linear prisms 61 is disposed on the substrate 65.

In some embodiments, the prism film 60 is disposed on the optical film 200. The prism film 60 includes a plurality of flat-top substantially linear first prisms 61' including a plurality of substantially flat first tops 63 facing the outermost skin layer 33 of the optical film 200. In some embodiments, the flat first tops 63 are substantially parallel to the major surface 202 of the prism film 60.

In some embodiments, the prism film 60 may include at least one of each of the plurality of linear prisms 61 and the plurality of flat-top substantially linear first prisms 61'.

In some embodiments, the optical film 200 of the optical construction 300 includes the outermost polymeric skin 30 including only the substantially crystalline stop layer 32. In such embodiments, the optical construction 300 further includes a substantially amorphous outermost layer 35 disposed adjacent the stop layer 32 and facing the linear prism tips 62. In some embodiments, the outermost layer 35 is the third polymeric skin layer 33 or the substantially amorphous outermost skin layer 33. In some embodiments, the outermost polymeric skin 30 includes the substantially amorphous outermost layer 35 disposed adjacent the stop layer 32. In other words, the first polymeric skin 30 further includes the outermost layer 35 disposed adjacent to the stop layer 32. Further, in some embodiments, the substantially amorphous outermost layer 35 includes the PETg.

The optical adhesive 50 may be interchangeably referred to as "the optical adhesive layer 50". The optical construction 300 further includes the optical adhesive layer 50 disposed between the outermost layer 35 and the prism film 60. In such embodiments, the substantially amorphous outermost layer 35 is the adhesion-promoting primer layer 40 for promoting adhesion between the stop layer 32 and the optical adhesive layer 50.

In some embodiments, each of the stop layer 32 and the outermost layer 35 has an average thickness of greater than about 100 nm. In some embodiments, the stop layer 32 has the average thickness ts12 of greater than about 100 nm. In some embodiments, the stop layer 32 has the average thickness ts12 of greater than about 200 nm, greater than about 300 nm, greater than about 400 nm, greater than about 500 nm, greater than about 600 nm, or greater than about 700 nm.

In some embodiments, the outermost layer 35 has the average thickness tm (not shown). The outermost layer 35 defines the average thickness tm along the z-direction. The term "average thickness tm" as used herein refers to an average of thicknesses measured at multiple points along a plane (i.e., the x-y plane) of the outermost layer 35. Therefore, the outermost layer 35 has the average thickness tm of greater than about 100 nm. In some embodiments, the outermost layer 35 has the average thickness tm of greater than about 200 nm, greater than about 300 nm, greater than about 400 nm, greater than about 500 nm, greater than about 600 nm, or greater than about 700 nm.

In some embodiments, the outermost layer 35 is the third polymeric skin layer 33. In such embodiments, the outermost layer 35 has the average thickness ts13 of greater than about 0.75 microns. In some embodiments, the outermost layer 35 has the average thickness ts13 of greater than about 1 micron, 1.2 microns, or 1.5 microns.

In some embodiments, the optical construction 300 may be interchangeably referred to as "the optical stack 300". The optical stack 300 may be formed by placing the optical film 200 on the prism film 60. Further, in some embodiments, the optical stack 300 is formed by placing the reflective polarizer 200 on the prism film 60.

In some embodiments, the plurality of linear prisms 61 of the prism film 60 may be substantially linear and may be interchangeably referred to as "the substantially linear prisms 61". In some embodiments, the linear prism tips 62 of the prism film 60 may be substantially linear and may be interchangeably referred to as "the substantially linear prism tips 62". Therefore, in some embodiments, the prism film 60 includes the plurality of substantially linear prisms 61 including the plurality of substantially linear prism tips 62.

Further, the optical stack 300 is formed, such that the stop layer 32 faces the substantially linear prism tips 62. In some embodiments, the optical stack 300 is formed with the outermost layer 35 facing the substantially linear prism tips 62. In some embodiments, the optical stack 300 is formed by placing the optical film 200 including the one or more stop layers 32 on the prism film 60. In such embodiments, a first one of the one or more stop layers 32 faces the linear prism tips 62.

In some embodiments, portions of the linear prism tips 62 penetrate the optical adhesive layer 50 and the outermost layer 35, not greater than about 4 microns in the stop layer 32, to define an interior air cavity 64 between the prism and optical films 60, 200. In some embodiments, the portions of the linear prism tips 62 penetrate the optical adhesive layer 50 and the outermost layer 35, not greater than about 3.5 microns, not greater than about 3 microns, or not greater than about 2.5 microns in the stop layer 32, to define the interior air cavity 64 between the prism and optical films 60, 200. In some embodiments, the portions of the linear prism tips 62 penetrate the optical adhesive layer 50 and the outermost layer 35, to about 2.5 microns in the stop layer 32, to define the interior air cavity 64 between the prism and optical films 60, 200.

In some embodiments, portions of the flat first tops 63 penetrate the optical adhesive layer 50 to define the interior air cavity 64 between the prism and optical films 60, 200.

Figure 3C:
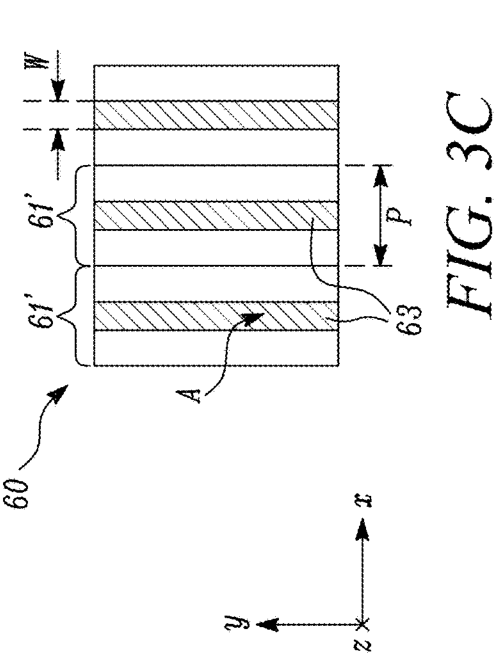
FIG. 3C illustrates a schematic top view of a prism film of the optical construction, according to another embodiment of the present disclosure.
Figure 3D:
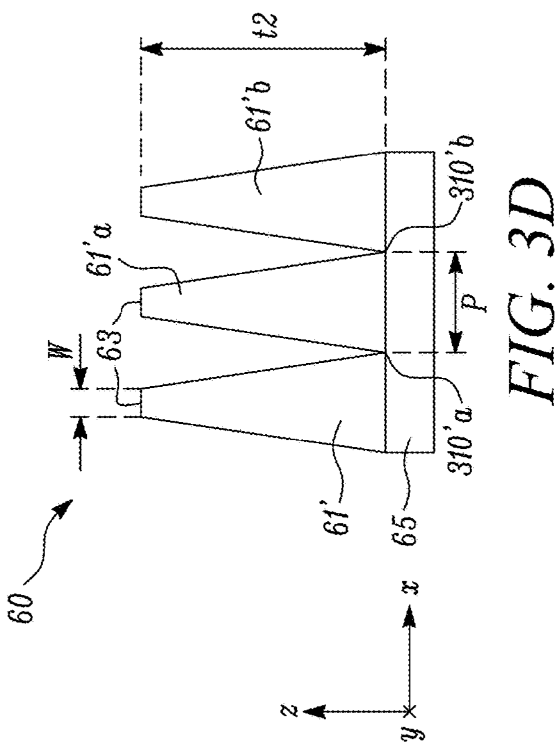
FIG. 3D illustrates a schematic sectional view of some flat-top substantially linear first prisms of a plurality of flat-top substantially linear first prisms of the prism film of FIG. 3C, according to an embodiment of the present disclosure.
Figure 3A:
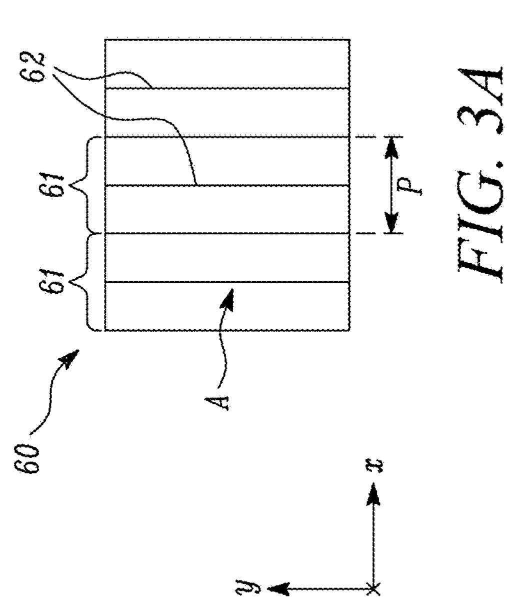
FIG. 3A illustrates a schematic top view of a prism film of the optical construction, according to an embodiment of the present disclosure.

FIG. 3A illustrates a detailed schematic top view of the prism film 60, according to an embodiment of the present disclosure. In some embodiments, the linear prisms 61 extend substantially along a first direction and are arranged substantially along an orthogonal second direction at a pitch P. In some embodiments, the first direction is along the x-direction and the second direction is along the y-direction. The term "pitch P" as used herein refers to a magnitude of a distance between corresponding points of any two adjacent substantially linear prisms 61, along the first direction (i.e., the x-direction). In some embodiments, the linear prisms 61 are arranged at the pitch P of between about 50 microns and about 90 microns. In some embodiments, the plurality of substantially linear prisms 61 are arranged at the pitch P of between about 60 microns and about 80 microns, or between about 65 microns and about 85 microns.

Figure 3B:
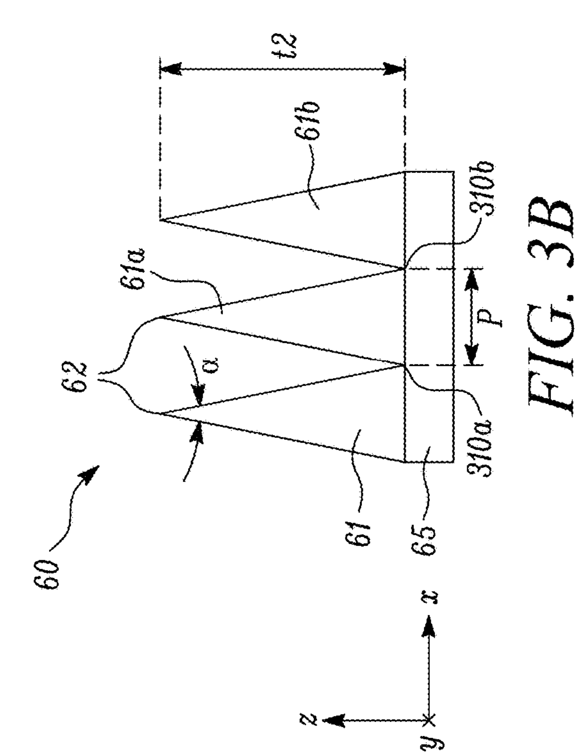
FIG. 3B illustrates a schematic sectional view of some substantially linear prisms of a plurality of substantially linear prisms of the prism film of FIG. 3A, according to an embodiment of the present disclosure.

FIG. 3B illustrates a schematic sectional view of some substantially linear prisms 61 of the plurality of substantially linear prisms 61 shown in FIG. 2A, according to an embodiment of the present disclosure.

In the illustrated embodiment of FIG. 3B, the pitch P indicates a distance between corresponding first troughs 310*a*, 310*b* of two adjacent substantially linear prisms 61*a*, 61*b*, along the first direction (i.e., the x-direction).

In some embodiments, the plurality of substantially linear prisms 61 has an average prism height t2. Specifically, each of the plurality of substantially linear prisms 61 has the average prism height t2. The substantially linear prisms 61 define the average prism height t2 along the z-direction. The term "average prism height" as used herein refers to an average of the heights of the plurality of substantially linear prisms 61 along the z-direction. In some embodiments, the average prism height t2 of the plurality of substantially linear prisms 61 is between about 25 and about 45 microns. In some embodiments, the average prism height t2 of the plurality of substantially linear prisms 61 is between about 30 and about 40 microns, between about 32 and about 38 microns, between about 33 and about 37 microns, or between about 34 and about 36 microns. In some embodiments, the substantially linear prisms 61 have substantially equal heights (i.e., the average prism height t2) along at least a contact area A (shown in FIG. 3A). The term "contact area A", as used herein refers to a sum of areas of the substantially linear prisms 61 that are in contact with the optical film 200 (as shown in FIG. 2). In the illustrated embodiment of FIG. 3B, the contact area A is a sum of areas of the plurality of linear prism tips 62 corresponding to the plurality of the substantially linear prisms 61 along a plane (the x-y plane) of the prism film 60.

In some embodiments, the linear prisms 61 have an average prism peak angle $\alpha$ of between about 70 degrees and about 110 degrees at the linear prism tips 62. In some embodiments, the linear prisms 61 have the average prism peak angle $\alpha$ of between about 80 degrees and about 100 degrees, or between about 85 degrees and about 95 degrees at the linear prism tips 62.

Referring to FIGS. 3A and 3B, in some embodiments, the linear prisms 61 have the average prism height t2 of about 35 microns, the average prism pitch P of about 70 microns, and the average prism peak angle $\alpha$ of about 90 degrees at the linear prism tips 62.

FIG. 3C illustrates a detailed schematic top view of the prism film 60, according to another embodiment of the present disclosure. In the illustrated embodiment of FIG. 3C, the prism film 60 includes the plurality of linear first prisms 61' extending substantially along the first direction and are arranged substantially along the second direction at the pitch P.

FIG. 3D illustrates a schematic sectional view of some substantially linear first prisms 61' of the plurality of substantially linear first prisms 61', according to an embodiment of the present disclosure. In the illustrated embodiment of FIG. 3D, the pitch P indicates a distance between corresponding first troughs 310'*a*, 310'*b* of two adjacent linear first prisms 61'*a*, 61'*b*, along the first direction (i.e., the x-direction).

In some embodiments, the plurality of substantially linear first prisms 61' has the average prism height t2. Specifically, each of the plurality of substantially linear first prisms 61' has the average prism height t2. The substantially linear first prisms 61' define the average prism height t2 along the z-direction. The term "average prism height" as used herein refers to an average of the heights of the plurality of substantially linear first prisms 61' along the z-direction. In some embodiments, the average prism height t2 of the plurality of substantially linear first prisms 61' may be between about 25 and about 45 microns. In some embodiments, the substantially linear first prisms 61' may have substantially equal heights (i.e., the average prism height t2) along at least the contact area A (shown in FIG. 3C). The term "contact area A", as used herein refers to a sum of areas of the substantially linear first prisms 61' that are in contact with the optical film 200 (as shown in FIG. 2). In the illustrated embodiment of FIG. 3D, the contact area A is a sum of areas of the plurality of flat first tops 63 corresponding to the plurality of the substantially linear first prisms 61', along the plane of the prism film 60.

The flat first tops 63 have an average width W. The term "average width W" as used herein refers to an average of the widths of the plurality of flat first tops 63 along the x-direction. The flat first tops 63 have the average width W equal to or greater than about 0.5 microns, i.e., W≥0.5 microns. In some embodiments, W≥0.6 microns, W≥0.7 microns, W≥0.8 microns, W≥0.9 microns, or W≥1 micron.

In some embodiments, the flat first tops 63 of the first prisms 61' are arranged at the pitch P. In some embodiments, a ratio of the average pitch P to the average width W of the flat first tops 63 is equal to or greater than about 10 and less than or equal to about 150, i.e., 10≤(P/W)≤150. In other words, the pitch P of the flat first tops 63 is substantially greater than the average width W of the flat first tops 63. In some embodiments, 12≤(P/W)≤120, 15≤(P/W)≤100, 15≤(P/W)≤80, 15≤(P/W)≤70, or 15≤(P/W)≤60. In some embodiments, 10≤(P/W)≤100.

The flat first tops 63 may be interchangeably referred to as "the substantially flat tops 63". In some embodiments, the substantially flat tops 63 have the average width W of greater than about 0.5 microns and less than about 7 microns. In some embodiments, the substantially flat tops 63 have the average width W of greater than about 0.6 microns, greater than about 0.7 microns, greater than about 0.8 microns, greater than about 0.9 microns, or greater than about 1 micron. In some embodiments, the substantially flat tops 63 have the average width W of less than about 6 microns, less than about 5 microns, less than about 4 microns, less than about 3 microns, less than about 2 microns, or less than about 1 micron.

Referring now to FIGS. 2A, 3A-3D, in some embodiments, a substantially constant compressive force 70 is applied to a stop layer side 301 of the optical stack 300 substantially uniformly over the contact area A (shown in FIG. 3A) resulting in a pressure of greater than 0.05 millinewtons per millimeter (mN/mm) applied to a total length of the linear prism tips 62 that make physical contact with the stop layer 32 in the contact area A. In some embodiments, the substantially constant compressive force 70 is applied to the stop layer side 301 of the optical stack 300 substantially uniformly over the contact area A resulting in the pressure of greater than 0.1 mN/mm, greater than 0.2 mN/mm, greater than 0.3 mN/mm, greater than 0.4 mN/mm, greater than 0.5 mN/mm, greater than 0.6 mN/mm, greater than 0.7 mN/mm, greater than 0.8 mN/mm, or greater than 0.85 mN/mm applied to the total length of the linear prism tips 62 that make physical contact with the stop layer 32 in the contact area A. The stop layer side 301 of the optical stack 300 corresponds to a side that is distal to the stop layer 32. In the illustrated embodiment of FIG. 2A, the major surface 202 of the prism film 60 is disposed at the stop layer side 301 and receives the substantially constant compressive force 70. In some embodiments, a uniform compressive force (not shown) may be applied to the outermost surface 203 of the optical stack 300. Therefore, the substantially constant compressive force 70 applied at the stop layer side 301 of the optical stack 300 may be a reactive force to the uniform compressive force applied to the outermost surface 203 of the optical stack 300.

Further, when the substantially constant compressive force 70 is applied to the stop layer side 301 of the optical stack 300 substantially uniformly over the contact area A while subjecting the optical stack to a temperature of at least about 60° C. for at least about 50 hours, any penetration t1 of the linear prism tips 62 into the stop layer 32 across the contact area A is less than about 5% of the average height t2 of the plurality of linear prisms 61 that makes physical contact with the stop layer 32 in the contact area A. In some embodiments, any penetration t1 of the linear prism tips 62 into the stop layer 32 across the contact area A is less than about less than about 4%, less than about 3%, less than about 2%, less than about 1%, or less than about 0.5% of the average height t2 of the plurality of linear prisms 60 that make physical contact with the stop layer 32 in the contact area A.

In some embodiments, the substantially constant compressive force 70 is applied to the stop layer side 301 of the optical stack 300 substantially uniformly over the contact area A while subjecting the optical stack to the temperature of at least about 70° C., at least about 80° C., at least about 90° C., at least about 100° C., or at least about 110° C. for at least about 50 hours. In some embodiments, the substantially constant compressive force 70 is applied to the stop layer side 301 of the optical stack 300 substantially uniformly over the contact area A while subjecting the optical stack to the temperature of at least about 60° C. for at least about 60 hours, for at least about 70 hours, for at least about 80 hours, or for at least about 90 hours.

In the embodiments where the outermost layer 35 is disposed adjacent to the stop layer 32, when the substantially constant compressive force 70 is applied to the stop layer side 301 of the optical stack 300 over the contact area A resulting in the pressure of greater than 0.05 mN/mm applied to the total length of the linear prism tips 62 in the contact area A while subjecting the optical stack 300 to the temperature of at least 60° C. for at least about 50 hours so that the linear prism tips 62 completely penetrate the outermost layer 35, any penetration t1 of the linear prism tips 62 into the stop layer 32 across the contact area A is less than about 5% of the average height t2 of the plurality of linear prisms 61.

In other words, when the optical stack 300 is subjected to the substantially constant compressive force 70 and the temperature of at least 60° C. for at least about 50 hours, the stop layer 32 may limit the penetration t1 of the linear prism tips 62 into the stop layer 32 to less than about 5% of the average height t2 of the plurality of linear prisms 60 that make physical contact with the stop layer 32 in the contact area A. Therefore, the stop layer 32 may limit or preclude the penetration of the linear prism tips 62 into the plurality of polymeric microlayers 10, 11, thereby preventing the linear prism tips 62 from damaging the plurality of polymeric microlayers 10, 11, which may otherwise negatively affect the optical properties of the optical stack 300.

In some embodiments, while subjecting the optical stack 300 to the temperature of at least between about 60° C. and about 80° C., the optical stack 300 is also subjected to a relative humidity of at least 70%. In some embodiments, while subjecting the optical stack 300 to the temperature of at least between about 60° C. and about 80° C., the optical stack 300 is also subjected to a relative humidity of at least 75%, at least 80%, at least 85%, at least 90%, or at least 95%.

In the embodiments where the first polymeric skin 30 includes the one or more stop layers 32, when the substantially constant compressive force 70 is applied to the stop layer side 301 of the optical stack 300 substantially uniformly over the contact area A resulting in the pressure of greater than 0.05 mN/mm applied to the total length of the linear prism tips 62 that make physical contact with the first one of the one more stop layers 32 in the contact area A while subjecting the optical stack 300 to a temperature that is greater than a glass transition temperature (Tg) of the first one of the one or more stop layers 32 by at least 1.5% for at least about 5 hours and at most about 15 hours, any penetration t1 of the linear prism tips 62 into the first one of the one more stop layers 32 across the contact area A is less than about 15% of the average height t2 of the plurality of linear prisms 61 that make physical contact with the first one of the one or more stop layers 32 in the contact area A. In some embodiments, any penetration t1 of the linear prism tips 62 into the first one of the one more stop layers 32 across the contact area A is less than about 12%, less than about 10%, less than about 8%, less than about 6%, less than about 5%, less than about 4%, less than about 3%, less than about 2%, less than about 1%, or less than about 0.5% of the average height t2 of the plurality of linear prisms 61 that make physical contact with the first one of the one or more stop layers 32 in the contact area A.

In some embodiments, the substantially constant compressive force 70 is applied to the stop layer side 301 of the optical stack 300 substantially uniformly over the contact area A while subjecting the optical stack 300 to the temperature that is greater than the Tg of the first one of the one or more stop layers 32 by at least 2%, by at least 3%, by at least 4%, or by at least 5% for at least about 5 hours and at most about 15 hours.

In some embodiments, the optical stack 300 is subjected to the temperature that is greater than the Tg of the first one of the one or more stop layers 32 by no more than about 10%. In some embodiments, the optical stack 300 is subjected to the temperature that is greater than the Tg of the first one of the one or more stop layers 32 by no more than about 9%, by no more than about 8%, or by no more than about 7%.

In some embodiments, the substantially constant compressive force 70 is applied to the stop layer side 301 of the optical stack 300 substantially uniformly over the contact area A while subjecting the optical stack 300 to the temperature that is greater than the Tg of the first one of the one or more stop layers 32 by at least 1.5% for at least about 6 hours, at least about 7 hours, or at least about 8 hours, and at most about 15 hours, at most about 17 hours, at most about 20 hours, at most about 22 hours, or at most about 24 hours.

In some embodiments, the Tg of the first of the one or more stop layers 32 is about 83° C. In some embodiments, the substantially constant compressive force 70 is applied to the stop layer side 301 of the optical stack 300 substantially uniformly over the contact area A while subjecting the optical stack 300 to the temperature that is greater than the Tg of the first one of the one or more stop layers 32 by about 2.4% for at least about 5 hours and at most about 15 hours. In some embodiments, any penetration t1 of the linear prism tips 62 into the first one of the one more stop layers 32 across the contact area A is less than about 14% of the average height t2 of the plurality of linear prisms 61 that make physical contact with the first one of the one or more stop layers 32 in the contact area A. In some embodiments, any penetration t1 of the plurality of linear prism tips 62 into the first one of the one more stop layers 32 across the contact area A is between about 2 microns and about 7 microns.

In other words, when the optical stack 300 is subjected to the substantially constant compressive force 70 and the temperature that is greater than the Tg of the first one of the one or more stop layers 32 by at least 1.5% for at least about 5 hours and at most about 15 hours, the first one of the one or more stop layers 32 may limit the penetration t1 of the linear prism tips 62 into the stop layer 32 to less than about 15% of the average height t2 of the plurality of linear prisms 60 that make physical contact with the stop layer 32 in the contact area A. Therefore, the first one of the one or more stop layers 32 may limit or preclude the penetration of the linear prism tips 62 into the plurality of polymeric microlayers 10, 11, thereby preventing the linear prism tips 62 from damaging the plurality of polymeric microlayers 10, 11, which may otherwise negatively affect the optical properties of the optical stack 300.

In some embodiments, while subjecting the optical stack 300 to the temperature that is less than the Tg of the first one of the one more stop layers 32 by no more than about 15% for at least about 5 hours and at most about 15 hours, any penetration t1 of the linear prism tips 62 into the first one of the one more stop layers 32 across the contact area A is less than about 10% of the average height t2 of the plurality of linear prisms 61 that make physical contact with the first one of the one more stop layers 32 in the contact area A.

In some embodiments, while subjecting the optical stack 300 to the temperature of about 75° C. that is less than the Tg of the first one of the one more stop layers 32 by about 9.6% for at least about 5 hours and at most about 15 hours, any penetration t1 of the linear prism tips 62 into the first one of the one more stop layers 32 across the contact area A is less than about 5% of the average height t2 of the plurality of linear prisms 61 that make physical contact with the first one of the one more stop layers 32 in the contact area A. In some embodiments, the penetration t1 is between about 0.4 microns and about 2.5 microns.

In other words, when the optical stack 300 is subjected to the substantially constant compressive force 70 and the temperature that is less than the Tg of the first one of the one or more stop layers 32 by no more than 15% for at least about 5 hours and at most about 15 hours, the first one of the one or more stop layers 32 may limit the penetration t1 of the linear prism tips 62 into the stop layer 32 to less than about 10% of the average height t2 of the plurality of linear prisms 60 that make physical contact with the stop layer 32 in the contact area A. Therefore, the first one of the one or more stop layers 32 may limit or preclude the penetration of the linear prism tips 62 into the plurality of polymeric microlayers 10, 11, thereby preventing the linear prism tips 62 from damaging the plurality of polymeric microlayers 10, 11, which may otherwise negatively affect the optical properties of the optical stack 300.

In some embodiments, when the substantially constant compressive force 70 is applied to the optical construction 300 substantially uniformly over the contact area A resulting in the pressure of greater than 0.05 mN/mm applied to the total length of the flat first tops 63 that make physical contact with the substantially amorphous outermost skin layer 33 in the contact area A, while subjecting the optical construction 300 to the temperature that is greater than the Tg of the substantially amorphous outermost skin layer 33 by at least about 1.5% for at least about 8 hours, any penetration t1 of the flat first tops 63 into the substantially amorphous outermost skin layer 33 across the contact area A is less than about 7% of the average height t2 of the plurality of flat-top substantially linear first prisms 61'. In some embodiments, any penetration t1 of the flat first tops 63 into the substantially amorphous outermost skin layer 33 across the contact area A is less than about 6%, less than about 5%, less than about 4%, less than about 3%, less than about 2%, less than about 1%, or less than about 0.5% of the average height t2 of the plurality of flat-top substantially linear first prisms 61'.

In some embodiments, the optical construction 300 is subjected to the temperature that is greater than the Tg of the substantially amorphous outermost skin layer 33 by at least about 7%, or by at least about 15% for at least about 8 hours, at least about 20 hours, for at least about 30 hours, for at least about 40 hours, for at least about 50 hours, for at least about 60 hours, or for at least about 70 hours.

In some embodiments, the Tg of the substantially amorphous outermost skin layer 33 is about 83° C. In some embodiments, the optical construction 300 is subjected to the temperature of about 85° C. that is greater than the Tg of the substantially amorphous outermost skin layer 33 by about 2.4% for at least about 8 hours, any penetration t1 of the flat first tops 63 into the substantially amorphous outermost skin layer 33 across the contact area A is about 7.1% of the average height t2 of the plurality of flat-top substantially linear first prisms 61'.

In other words, when the optical construction 300 is subjected to the substantially constant compressive force 70 and the temperature that is greater than the Tg of the substantially amorphous outermost skin layer 33 by at least about 7% for at least about 8 hours, the amorphous outermost skin layer 33 limits the penetration t1 of the flat first tops 63 into the substantially amorphous outermost skin layer 33 across the contact area A to less than about 7% of the average height t2 of the plurality of flat-top substantially linear first prisms 61'. Therefore, the amorphous outermost skin layer 33 may limit or preclude the penetration of the flat first tops 63 into the plurality of polymeric microlayers 10, 11, thereby preventing the flat first tops 63 from damaging the plurality of polymeric microlayers 10, 11, which may otherwise negatively affect the optical properties of the optical construction 300. Further, the optical construction 300 including the prism layer 60 having substantially linear first prisms 61' including the flat first tops 63 may have a lesser penetration into the substantially amorphous outermost skin layer 33 across the contact area A than the plurality of substantially linear first prisms 61 having the linear prism tips 62.

EXAMPLES AND RESULTS

Figure 4A:
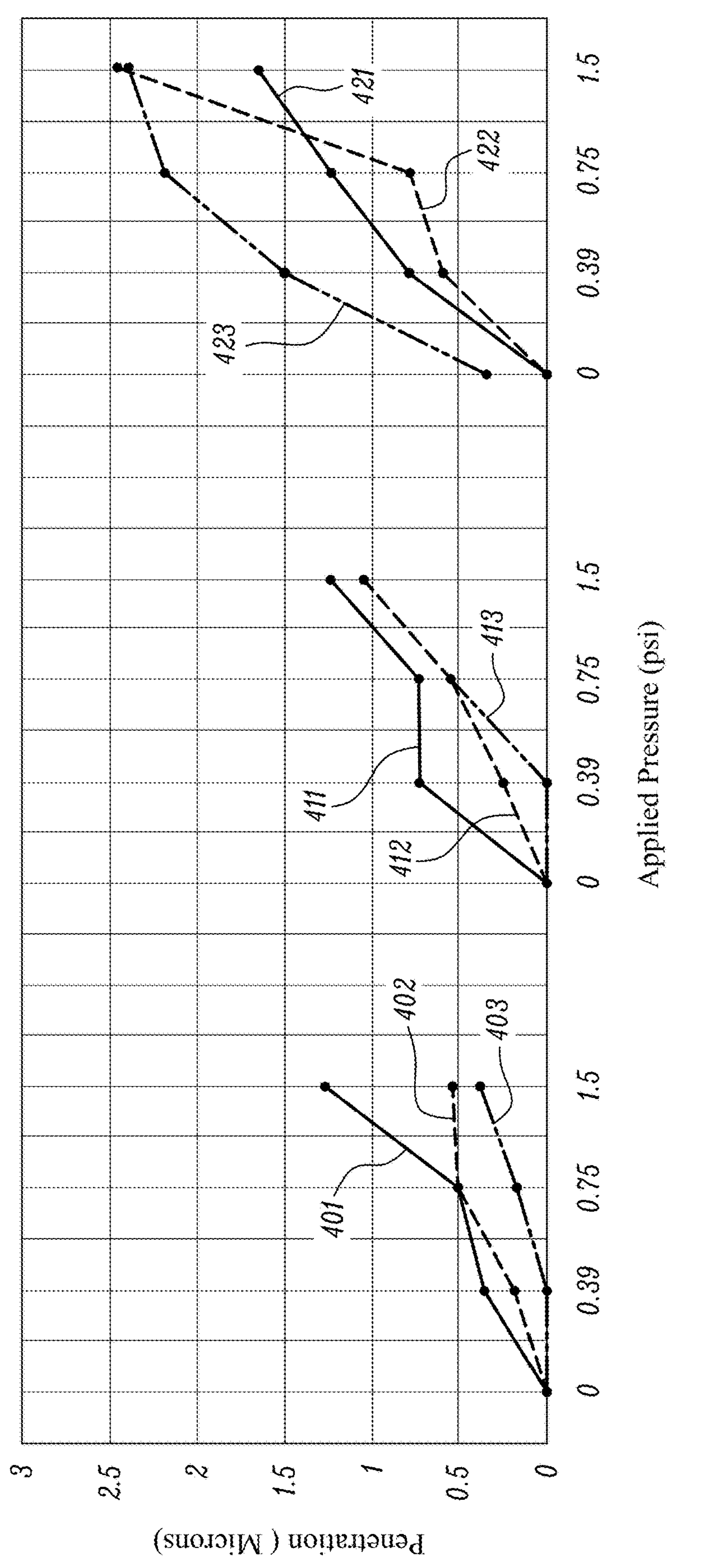
FIG. 4A illustrates a plot including various curves depicting respective penetration versus applied pressure applied to the optical construction while subjecting the optical construction to a first temperature for different time durations, according to an embodiment of the present disclosure.

FIG. 4A illustrates a plot 400 including various curves depicting respective penetration (e.g., the penetration t1) versus applied pressure (due to the substantially constant compressive force 70) applied to an optical construction (e.g., the optical construction 300) while subjecting the optical construction to a first temperature for different time durations, according to an embodiment of the present disclosure. The penetration is depicted in microns on the left ordinate, and the applied pressure is depicted in pounds per square inch (psi) in the abscissa.

The plot 400 includes various curves depicting the respective penetration versus applied pressure applied to the total length of a plurality of linear prisms (e.g., the linear prisms 61) having sharp prism tips (Sample A), a plurality of linear prisms (e.g., the linear first prisms 61') having substantially flat tops having an average width (e.g., the average width W) of about 2 microns (Sample B) and a plurality of linear prisms (e.g., the linear first prisms 61') having substantially flat tops having an average width (e.g., the average width W) of about 4 microns (Sample C) that make physical contact with the stop layer of the optical construction being subjected to the first temperature of about 75° C. for about 8 hours, about 24 hours, and about 72 hours.

Further, the Tg of the stop layer was about 83° C. and an average height (e.g., the average height t2) of the pluralities of linear prisms of the Samples A, B, C, was about 35 microns, about 34 microns, and about 33 microns, respectively. Further, each of the pluralities of linear prisms of the Samples A, B, C had a pitch equal to about 70 microns, and each of the pluralities of the linear prisms of the samples A, B, C had a peak angle of about 90 degrees. The first temperature of about 75° C. was lesser than the Tg of the stop layer of the optical construction.

The plot 400 includes curves 401, 402, 403 depicting the penetration versus applied pressure for the Samples A, B, C, respectively, when the optical construction was subjected to the first temperature of about 75° C. for about 8 hours.

Referring to the curve 401, a penetration for the Sample A, for the applied pressure of about 1.5 psi, at the first temperature of about 75° C. for about 8 hours, was about 1.27 microns, which is about 3.7% of the average height of the plurality of linear prisms of the Sample A.

Referring to the curve 402, a penetration for the Sample B, for the applied pressure of about 1.5 psi, at the first temperature of about 75° C. for about 8 hours, was about 0.53 microns, which is about 1.6% of the average height of the plurality of linear prisms of the Sample B.

Referring to the curve 403, a penetration for the Sample C, for the applied pressure of about 1.5 psi, at the first temperature of about 75° C. for about 8 hours, was about 0.38 microns, which is about 1.2% of the average height of the plurality of linear prisms of the Sample C.

As is apparent from the curves 401, 402, 403, the penetration for the plurality of linear prisms of the Sample A is greater than the penetrations for the pluralities of linear prisms of the Samples B and C for the applied pressure of about 1.5 psi, at the first temperature of about 75° C. for about 8 hours. Therefore, the plurality of linear prisms having the substantially flat tops may have lesser penetration into the stop layer than the plurality of linear prisms having the sharp tips for the applied pressure of about 1.5 psi, at the first temperature of about 75° C. for about 8 hours.

The plot 400 further includes curves 411, 412, 413 depicting the penetration versus applied pressure for the Samples A, B, C, respectively, when the optical construction was subjected to the first temperature of about 75° C. for about 24 hours.

Referring to the curve 411, a penetration for the Sample A, for the applied pressure of about 1.5 psi, at the first temperature of about 75° C. for about 24 hours, was about 1.22 microns, which is about 3.5% of the average height of the plurality of linear prisms of the Sample A.

Referring to the curve 412, a penetration for the Sample B, for the applied pressure of about 1.5 psi, at the first temperature of about 75° C. for about 24 hours, was about 1.06 microns, which is about 3.1% of the average height of the plurality of linear prisms of the Sample B.

Referring to the curve 413, a penetration for the Sample C, for the applied pressure of about 1.5 psi, at the first temperature of about 75° C. for about 24 hours, was about 1.06 microns, which is about 3.2% of the average height of the plurality of linear prisms of the Sample C.

As is apparent from the curves 411, 412, 413, the penetration for the plurality of linear prisms of the Sample A is greater than the penetrations for the pluralities of linear prisms of the Samples B and C for the applied pressure of about 1.5 psi, at the first temperature of about 75° C. for about 24 hours. Therefore, the plurality of linear prisms having the substantially flat tops may have lesser penetration into the stop layer than the plurality of linear prisms having the sharp tips for the applied pressure of about 1.5 psi, at the first temperature of about 75° C. for about 24 hours.

The plot 400 further includes curves 421, 422, 423 depicting the penetration versus applied pressure for the Samples A, B, C, respectively, when the optical construction was subjected to the first temperature of about 75° C. for about 72 hours.

Referring to the curve 421, a penetration for the Sample A, for the applied pressure of about 1.5 psi, at the first temperature of about 75° C. for about 72 hours, was about 1.64 microns, which is about 4.7% of the average height of the plurality of linear prisms of the Sample A.

Referring to the curve 422, a penetration for the Sample B, for the applied pressure of about 1.5 psi, at the first temperature of about 75° C. for about 72 hours, was about 2.46 microns, which is about 7.2% of the average height of the plurality of linear prisms of the Sample B.

Referring to the curve 423, a penetration for the Sample C, for the applied pressure of about 1.5 psi, at the first temperature of about 75° C. for about 72 hours, was about 2.41 microns, which is about 7.3% of the average height of the plurality of linear prisms of the Sample C.

As is apparent from the curves 421, 422, 423, the penetration for the plurality of linear prisms of the Sample A is lesser than the penetrations for the pluralities of linear prisms of the Samples B and C for the applied pressure of about 1.5 psi, at the first temperature of about 75° C. for about 72 hours. However, it should be noted that this may be due to error caused by noise in the measurements. The errors due to the noise in the measurement may be up to about 1 micron.

As is apparent from the plot 400, the penetrations for the pluralities of linear prisms of the Samples A, B, and C for the applied pressure of about 1.5 psi, at the first temperature lesser than the Tg of the stop layer for about 8 hours, about 24 hours, and about 72 hours, were less than about 7.5% of the average heights of the respective pluralities of linear prisms of the Samples A, B, and C.

Figure 4B:
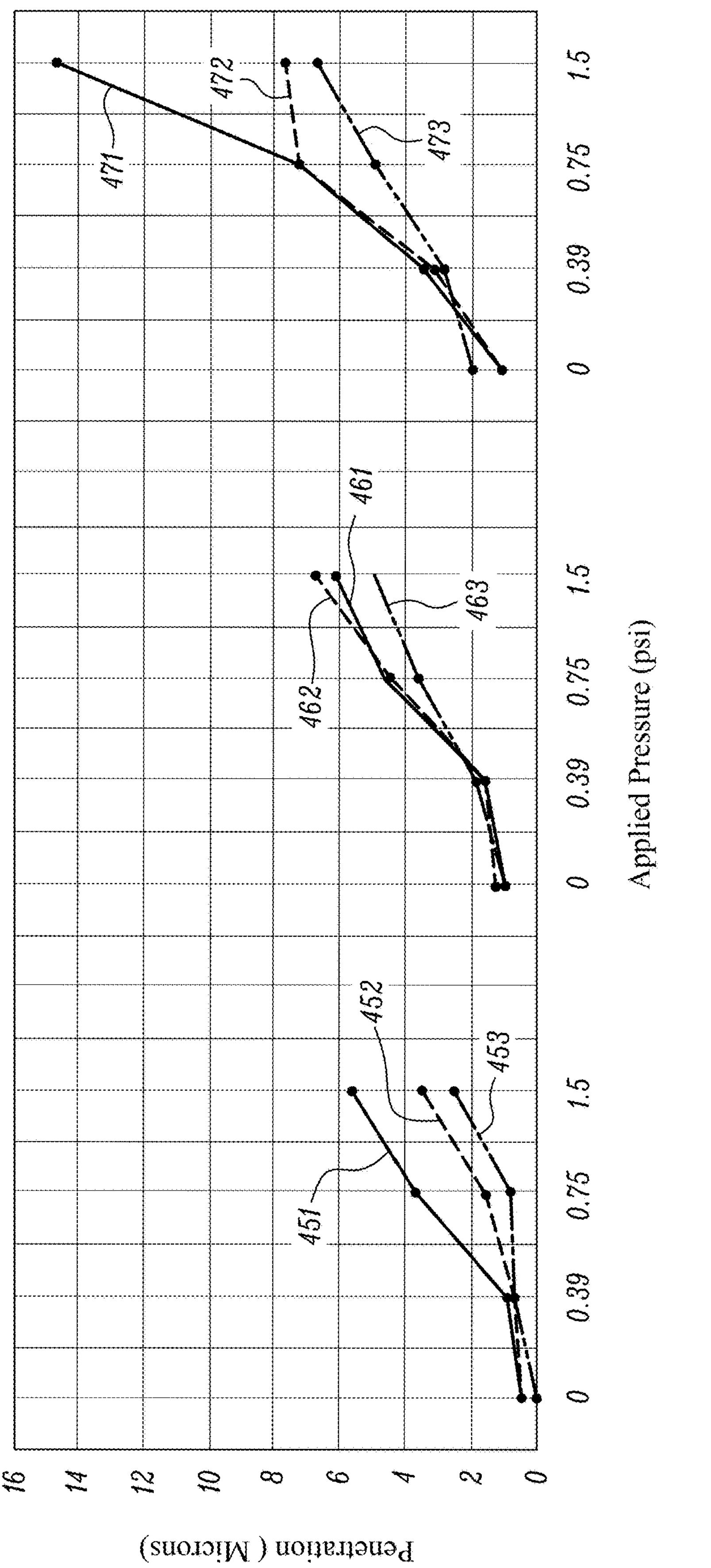
FIG. 4B illustrates a plot including various curves depicting respective penetration versus applied pressure applied to the optical construction while subjecting the optical construction to a second temperature for the different time durations, according to an embodiment of the present disclosure.

FIG. 4B illustrates a plot 450 including various curves depicting respective penetration versus applied pressure (due to the substantially constant compressive force 70) applied to the optical construction while subjecting the optical construction to a second temperature for the different time durations, according to an embodiment of the present disclosure.

Specifically, the plot 450 includes various curves depicting the respective penetration versus applied pressure applied to the total length of the pluralities of linear prisms of the Samples A, B, and C (described with reference to FIG. 4A) that make physical contact with the stop layer of the optical construction being subjected to the second temperature of about 85° C. for about 8 hours, about 24 hours, and about 72 hours. The second temperature of about 85° C. was greater than the Tg of the stop layer of the optical construction.

The plot 450 includes curves 451, 452, 453 depicting the penetration versus applied pressure for the Samples A, B, C, respectively, when the optical construction was subjected to the second temperature of about 85° C. for about 8 hours.

Referring to the curve 451, a penetration for the Sample A, for the applied pressure of about 1.5 psi, at the second temperature of about 85° C. for about 8 hours, was about 5.60 microns, which is about 16% of the average height of the plurality of linear prisms of the Sample A.

Referring to the curve 452, a penetration for the Sample B, for the applied pressure of about 1.5 psi, at the second temperature of about 85° C. for about 8 hours, was about 3.55 microns, which is about 10.4% of the average height of the plurality of linear prisms of the Sample B.

Referring to the curve 453, a penetration for the Sample C, for the applied pressure of about 1.5 psi, at the second temperature of about 85° C. for about 8 hours, was about 2.51 microns, which is about 7.6% of the average height of the plurality of linear prisms of the Sample C.

As is apparent from the curves 451, 452, 453, the penetration for the plurality of linear prisms of the Sample A is greater than the penetrations for the pluralities of linear prisms of the Samples B and C for the applied pressure of about 1.5 psi, at the second temperature of about 85° C. for about 8 hours. Therefore, the plurality of linear prisms having the substantially flat tops may have lesser penetration into the stop layer than the plurality of linear prisms having the sharp tips for the applied pressure of about 1.5 psi, at the second temperature of about 85° C. for about 8 hours.

The plot 450 further includes curves 461, 462, 463 depicting the penetration versus applied pressure for the Samples A, B, C, respectively, when the optical construction was subjected to the second temperature of about 85° C. for about 24 hours.

Referring to the curve 461, a penetration for the Sample A, for the applied pressure of about 1.5 psi, at the second temperature of about 85° C. for about 24 hours, was about 6.13 microns, which is about 17.5% of the average height of the plurality of linear prisms of the Sample A.

Referring to the curve 462, a penetration for the Sample B, for the applied pressure of about 1.5 psi, at the second temperature of about 85° C. for about 24 hours, was about 6.67 microns, which is about 19.6% of the average height of the plurality of linear prisms of the Sample B.

Referring to the curve 463, a penetration for the Sample C, for the applied pressure of about 1.5 psi, at the second temperature of about 85° C. for about 24 hours, was about 4.97 microns, which is about 15.1% of the average height of the plurality of linear prisms of the Sample C.

As is apparent from the curves 461, 462, 463, the penetration for the plurality of linear prisms of the Sample B is greater than the penetrations for the pluralities of linear prisms of the Samples A and C for the applied pressure of about 1.5 psi, at the second temperature of about 85° C. for about 24 hours. However, the penetrations for the pluralities of linear prisms of the Samples A and B are substantially similar and the variation may be due to error caused by noise in the measurements. Further, the penetration for the plurality of linear prisms of the Sample C is lesser than the penetrations for the pluralities of linear prisms of the Samples A and B for the applied pressure of about 1.5 psi, at the second temperature of about 85° C. for about 24 hours.

The plot 450 further includes curves 471, 472, 473 depicting the penetration versus applied pressure for the Samples A, B, C, respectively, when the optical construction was subjected to the second temperature of about 85° C. for about 72 hours.

Referring to the curve 471, a penetration for the Sample A, for the applied pressure of about 1.5 psi, at the second temperature of about 85° C. for about 72 hours, was about 14.62 microns, which is about 41.8% of the average height of the plurality of linear prisms of the Sample A.

Referring to the curve 472, a penetration for the Sample B, for the applied pressure of about 1.5 psi, at the second temperature of about 85° C. for about 72 hours, was about 7.71 microns, which is about 22.7% of the average height of the plurality of linear prisms of the Sample B.

Referring to the curve 473, a penetration for the Sample C, for the applied pressure of about 1.5 psi, at the second temperature of about 85° C. for about 72 hours, was about 6.68 microns, which is about 20.2% of the average height of the plurality of linear prisms of the Sample C.

As is apparent from the curves 471, 472, 473, the penetration for the plurality of linear prisms of the Sample A is substantially greater than the penetrations for the pluralities of linear prisms of the Samples B and C for the applied pressure of about 1.5 psi, at the second temperature of about 85° C. for about 72 hours. Therefore, the plurality of linear prisms having the substantially flat tops may have lesser penetration into the stop layer than the plurality of linear prisms having the sharp tips for the applied pressure of about 1.5 psi, at the second temperature of about 85° C. for about 72 hours.

As is apparent from the plot 450, the penetrations for the pluralities of linear prisms of the Samples A, B, and C for the applied pressure of about 1.5 psi, at the second temperature greater than the Tg of the stop layer for about 8 hours and about 24 hours, were less than about 20% of the average heights of the pluralities of linear prisms of the Samples A, B, and C. Further, the penetrations for the pluralities of linear prisms of the Samples B and C for the applied pressure of about 1.5 psi, at the second temperature greater than the Tg of the stop layer for about 72 hours, were about 20% of the average heights of the pluralities of linear prisms of the Samples B and C. However, the penetration for the plurality of linear prisms of the Sample A for the applied pressure of about 1.5 psi, at the second temperature greater than the Tg of the stop layer for about 72 hours, was greater than 20% of the average height of the plurality of linear prisms of the Sample A. Therefore, the plurality of linear prisms having the substantially flat tops may substantially reduce penetration into the stop layer, which may otherwise negatively affect the optical properties of the optical construction.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical film comprising a plurality of polymeric microlayers numbering at least 10 in total and disposed between, and co-extruded and co-stretched with, opposing first and second polymeric skins, each of the polymeric microlayers having an average thickness of less than about 400 nanometers (nm), each of the first and second polymeric skins having an average thickness of greater than about 1 micron, such that at least one of the first and second polymeric skins comprises a plurality of polymeric skin layers, each of the polymeric skin layers having an average thickness of greater than about 0.5 microns, the plurality of polymeric skin layers comprising a polymeric second skin layer disposed between polymeric first and third skin layers, wherein the polymeric second skin layer comprises one or more of a greater degree of crystallinity, a greater glass transition temperature, a greater modulus, and a greater in-plane birefringence than each of the polymeric first and third skin layers.

2. The optical film of claim 1, wherein the polymeric second skin layer is crystalline having a melting point of greater than about 260 degrees Celsius (° C.).

3. The optical film of claim 1, wherein at a substantially zero percent relative humidity, the polymeric second skin layer has a glass transition temperature of greater than about 100° C. and each of the polymeric first and third skin layers has a glass transition temperature of less than about 100° C.

4. The optical film of claim 1, wherein the polymeric third skin layer is disposed between the polymeric second skin layer and an outermost surface of the optical film, and wherein any layer of the optical film that is disposed between the polymeric third skin layer and the outermost surface, is not co-extruded and co-stretched with the polymeric microlayers and the first and second polymeric skins.

5. The optical film of claim 4, wherein any layer of the optical film that is disposed between the polymeric third skin layer and the outermost surface, is one or more of an optical adhesive, and an adhesion-promoting primer layer for promoting adhesion to an optical adhesive.

6. The optical film of claim 4, wherein any layer of the optical film that is disposed between the polymeric third skin layer and the outermost surface comprises an adhesion-promoting primer layer disposed between the polymeric third skin layer and an optical adhesive, the adhesion-promoting primer layer promoting adhesion to the optical adhesive.

7. The optical film of claim 1, wherein the polymeric first skin layer is disposed between the plurality of polymeric microlayers and the polymeric third skin layer, and wherein an average thickness of the polymeric first skin layer is greater than an average thickness of the polymeric third skin layer by at least 1 micron.

8. The optical film of claim 1, wherein the polymeric first skin layer is disposed between the plurality of polymeric microlayers and the polymeric second skin layer, and wherein an average thickness of the polymeric first skin layer is greater than an average thickness of the polymeric second skin layer by at least 1 micron.

9. The optical film of claim 1, wherein the polymeric second skin layer is disposed between the plurality of polymeric microlayers and the polymeric third skin layer, and wherein an average thickness of the polymeric second skin layer is within about 5 microns of an average thickness of the polymeric third skin layer.

10. The optical film of claim 1, wherein one of the polymeric first and third skin layers is an outermost layer of the optical film.

11. The optical film of claim 1 being a reflective polarizer, such that for a visible wavelength range extending from about 420 nm to about 680 nm, the plurality of polymeric microlayers has an average optical reflectance of greater than about 60% for an in-plane first polarization state and an average optical transmittance of greater than about 60% for an orthogonal in-plane second polarization state.

12. The optical film of claim 1, wherein for non-overlapping first and second wavelength ranges, each of the ranges at least 100 nm wide, and for each of first and second polarization states, the optical film has an optical reflectance of more than about 40% in one of the first and second wavelength ranges, and an optical transmittance of more than about 40% in the other one of the first and second wavelength ranges.

13. The optical film of claim 12, wherein one of the first and second wavelength ranges comprises at least one visible wavelength and the other one of the first and second wavelength ranges comprises at least one infrared wavelength.

* * * * *